June 30, 1959     A. F. DONOVAN     2,892,502

VIBRATION DAMPING DEVICE FOR HELICOPTER ROTOR BLADES

Filed April 21, 1955

INVENTOR.
A.F. DONOVAN
BY
ATTORNEYS

2,892,502

VIBRATION DAMPING DEVICE FOR HELICOPTER ROTOR BLADES

Allen F. Donovan, East Aurora, N.Y., assignor to the United States of America as represented by the Secretary of the Air Force Application April 21, 1955, Serial No. 503,041

2 Claims. (Cl. 170—160.13)

This invention relates to vibration dampers and particularly to damping means for inhibiting vibrations in airfoil surfaces such as wings, rudders and, more especially, rotor blades such as helicopter rotor blades.

In the operation of a helicopter, the rotor blade may have a natural frequency of vibration or some harmonic thereof, occurring within the operating range. If for any reason vibratory forces arise which have a frequency close or equal to their natural frequency or some harmonic thereof to establish a resonant frequency in the blade, blade deflections of excessive magnitude may occur and are likely to result in damage or breakage of the blades and possible loss of the aircraft.

Many methods and constructions have been employed in the prior art to overcome this difficulty but up to the present invention a completely satisfactory solution of the problem has not been found. In particular, the use of conventional dynamic vibration absorbers have not, by themselves, proven satisfactory. This type of absorber comprises in essence a predetermined mass pendulously supported from the frame of the body that is undergoing the undesired forced vibrations. The pendulum constituted by the suspended mass is positioned so as to be free to vibrate in the plane of these vibrations, the pendulum being tuned to oscillate at a particular frequency and when vibrations of that particular frequency are incurred by the body upon which the pendulum is mounted, the pendulum oscillates at that same frequency but in opposite phase relationship, thereby dampening the vibrations of the body. The magnitude of the vibration forces impressed on an airfoil control surface, such as on a helicopter blade, at its natural frequency or some harmonic thereof is so great that a large dynamic vibration absorber of the conventional type is required, however, the small cross sectional area, as well as aerodynamic and structural considerations prohibit the mounting of such a large vibration absorber, on airfoil surface or rotor blades. Also, the effect of such conventional dynamic vibration absorbers is too local in character on long flexible airfoil surfaces such as helicopter rotor blades thereby requiring a spaced plurality of such vibration absorbers on such blades, which course is impractical due to aerodynamic and structural considerations.

The present invention overcomes these difficulties by pendulously mounting a predetermined mass on an airfoil or rotor blade by pivot means with the tuned pendulum thereby constituted being free to oscillate in the plane of vibration incurred by the airfoil surface or rotor blade. An airfoil control surface is operatively connected to the airfoil surface or rotor blade so as to be able to dampen these vibrations of the airfoil surface or rotor blade by its aerodynamic effect when properly actuated and controlled. An operative connection is provided between the pendulum and airfoil control surface whereby the movements of the airfoil control surface are properly actuated and controlled by the pendulum to oppose the maximum forced amplitude which is developed at the resonant frequency of the rotor blade.

The proper action of the pendulum being assured by the well-known principle that if a pendulum is properly mounted on a vibrating body so as to be free to oscillate in the plane of the vibrations of the body, and if these vibrations of the body have a frequency equal to the natural frequency of the pendulum, at resonant frequency the pendulum will lag the movement of the body by one-quarter cycle of the period of vibration of the body. The pendulum of the present invention will further oscillate and control the airfoil control surface 180° out of phase with the vibrations of the pendulum, such that each oscillation of the airfoil surface or rotor blade is opposed to the aerodynamic effect of the airfoil control surface thereby damping the vibration of the airfoil surface or rotor blade.

Also, it is well-known in the art of vibration suppression that if the pendulum of a dynamic vibration absorber, mounted on a vibrating body, is provided with a damping dash pot means to dampen the oscillations of the pendulum, the pendulum will respond and oscillate when the vibrations of the body are of a frequency close to, as well as equal to, the natural frequency of the pendulum and also will act to reduce the vibration amplitude of the body. This fact produces a dynamic vibration absorber which will dampen vibrations close to, as well as equal to, the selected vibration frequency to be suppressed. It has been found advantageous to utilize this fact in the present invention, and a dash pot is therefore provided.

The advantages of the present invention are vested in the following objects of the invention.

The principal object of the present invention is to provide a construction whereby the tuned pendulum of a conventional dynamic vibration absorber mounted on an airfoil surface undergoing vibrations of a particular frequency or close thereto can amplify its vibration damping power by actuating and controlling an airfoil control surface operatively attached to the airfoil surface so as to dampen the vibrations of the airfoil surface at resonance by the aerodynamic effect of the airfoil control surface.

Another object is to provide a dynamic vibration absorber small enough to be mounted on an airfoil surface and effective enough to sufficiently dampen the vibration of the airfoil surface when they are of a particular frequency, or close thereto.

Another object is to provide a construction whereby the effect of a dynamic vibration absorber can be transmitted over a substantial length of airfoil surfaces thereby allowing the use of fewer, dynamic vibration absorbers on a long flexible airfoil surface.

Another object is to provide a dynamic vibration absorber that will be tuned to respond to selected vibrational frequencies or close thereto, of the airfoil surface upon which the absorber is mounted so as to dampen these vibrations.

Other objects of the invention will become apparent by reference to the following description and accompanying drawings in which like reference characters refer to like parts in the drawing.

Figure 1:
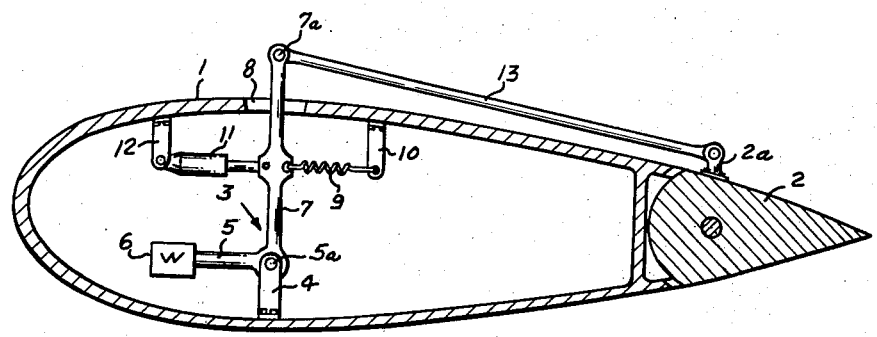
Figure 1 is a central sectional view through an airfoil surface and blade such as a helicopter blade, incorporating one form of the present invention therein.

Referring to Figure 1, a hollow helicopter blade body is indicated at 1, having an airfoil control surface 2 hinged to the blade at the trailing edge thereof. The control surface 2 is of a length spanwise of the blade 1 so as to be aerodynamically effective in damping the vibration of the blade occurring at or near the natural vibrational frequency of the blade assembly or some harmonic thereof. Inside the hollow body of the blade 1 is shown a bell crank member 3 of predetermined dimensions and weight. The crank member 3 is pivotably connected to a bracket 4 which is fixed to the floor or inner surface of the cavity within the blade body 1. One arm 5 of the bell crank is in a substantially horizontal position and has a mass 6 of predetermined weight secured to the end thereof. The other arm 7 of the bell crank 3 is in substantially a vertical position and extends through an aperture 8 in the upper surface of the hollow blade body 1. A spring 9 of predetermined value is attached to the vertical arm 7 at a point inside of the hollow body 1, the other end of this spring 9 is connected to a bracket 10, which is in turn fixed to the upper surface of the cavity in the block body 1. The position of this spring 9 is to provide a resilient restriction against movement of the control surface from a neutral position of the bell crank member 3.

A damping means, such as a dash pot 11, is also attached to the vertical arm 7 of the bell crank 3 at a point diametrically opposite the point of attachment of the spring 9. The other end of the dash pot 11 is attached to a bracket 12 which is in turn anchored to the upper surface of the blade body 1. The dash pot 11 is so positioned to dampen the oscillations of the bell crank member and the vibration amplitude of the rotor blade 1.

The pivoted bell crank 3 with its attached weight 6 and connecting spring 9 and dash pot 11 constitutes a mass pendulum, which by proper relation of proportions and weight of the mass and components of the pendulum, can be tuned to respond and oscillate when vibrations of a particular frequency are incurred by the rotor in which the pendulum is mounted, the frequency selected in the present case being the natural vibration frequency of the rotor blade assembly, and the term rotor blade assembly meaning the assembly of rotor blade and attached dynamic vibration absorber. These oscillations of the pendulum will have the same frequency as the vibrations of the blade but will be in an out of phase relationship to the vibrations of the blade as hereinafter more particularly described.

The end of the vertical arm 7 is provided with means 7a for pivotally connecting the bell crank member 3 to a rigid link 13, which is, in turn, pivotally connected to an actuation arm 2a projecting upwardly from the airfoil control surface 2; the link 13 and the arm 2a providing positive operative connection between the pendulum and the airfoil control surface 2 whereby the pendulum actuates and controls the movement of the airfoil surface 2. The mode of operation is as follows: When the substantially vertical vibrations of the blade assembly approach the natural frequency of the blade assembly, or some harmonic thereof, the pendulum which is mounted on the blade and tuned to this same frequency will begin to oscillate in the same plane as the vibrations of the blade due to the resonant condition developed. These oscillations will be of the same frequency as the vibrations of the blade assembly but at this condition of resonance the movement of the pendulum will lag the movement of the blade in vibration by a 90° phase angle. Therefore, over a 360° period of vibration in which the blade will trace a sinusoidal wave pattern the pendulum will be displaced through a coincident wave pattern 90° or one-quarter cycle later. Considering the displacement of the blade at particular instants of vibration, as the blade moves upwardly through a one-quarter cycle from a neutral or level position to a position of maximum displacement, mass W will have received the upward force of the blade, but at resonance will respond to the application of the upward force 90° later. The mass W therefore will begin its upward movement when the blade is at the maximum upward position. Thus, as the blade descends through the next one-quarter cycle to again return to a neutral position, the mass W will have moved upwardly to a maximum displacement position thereby moving the airfoil control surface to its maximum downward position. In this position the slip stream passing rearwardly under the blade will strike the downwardly displaced airfoil control surface to exert a vertical upward component of force directly opposed to the motion of the blade moving downwardly through the neutral position. In this way, the airfoil control surface 2 actually leads the displacement of the rotor blade 1 by 90° since it moves 180° out of phase with respect to the movement of the mass W. Subsequently, when the blade reaches its maximum downward position the control surface 2 and mass W will have returned to a neutral position; as the blade next passes upwardly through the neutral position again the control surface 2 will be at its maximum upward position of displacement leading the displacement of the blade by a one-quarter cycle or 90°. By linking the control surface 2 to the pendulous mass system in such a way that the control surface displacement is leading the blade vibration by 90°, the airfoil will be at its maximum upward and downward positions and therefore imparting the greatest opposing forces to the motion of the blade when the blade is moving at maximum velocity through the neutral position. When the blade is at zero velocity as it changes in direction at the points of maximum displacement the control surface will be at a neutral position. The control surface will thereby impart its most effective damping action when the blade is moved at maximum velocity.

Figure 2:
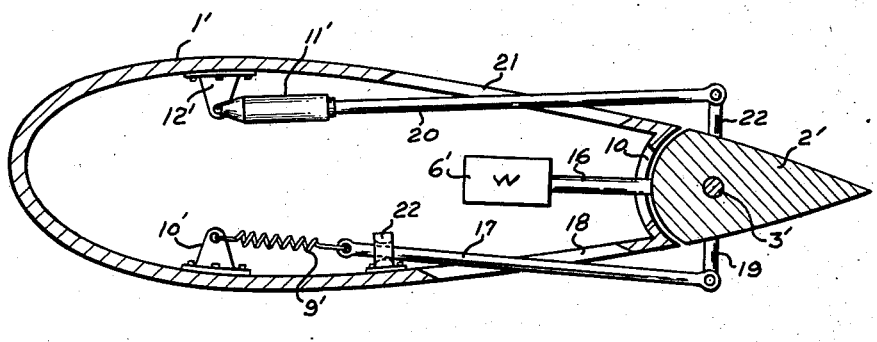
Figure 2 is a vertical sectional view through an airfoil surface, such as a helicopter blade, incorporating a modified form of the invention.

Figure 2 is a modified version of the invention shown in Figure 1 wherein an airfoil control surface 2' is hinged by the pin 3' to the trailing edge of the rotor blade body 1', the control surface 2' having a length spanwise sufficient to be aerodynamically effective in damping forced vibrations of a frequency corresponding to the natural frequency of the blade assembly, or any harmonic thereof.

Disposed within the hollow rotor blade body 1' is a predetermined mass 6' mounted on the end of an arm 16 of predetermined length which is attached, in outstanding fashion, to the leading edge of one airfoil control surface 2'. The arm 16 extends in substantially horizontal fashion from within the cavity within the blade body 1', through a suitable aperture 1a provided in the trailing edge of the blade body 1' with its inner end fixed in the leading edge of the airfoil control surface.

The construction provides a common pivot 3' for the control surface 2' and the mass 6'. A predetermined spring 9' is operatively connected between the control surface 2' and the blade body 1' as to resiliently oppose any vibration of the mass 6' and the control surface 2' from a neutral position. The spring 9' is located within the cavity provided in the blade body 1' and has one end connected to the lower inner surface of the blade body 1' by a bracket 10'. The other end is connected to an inflexible link 17 which extends through the lower wall of the blade body 1', through a suitable aperture 18, to pivotally connect with the arm 19, which is fixed to the lower surface of the airfoil surface 2'. A guide bracket 22 is fixed to receive the inner end of the link 17 and guide the same.

A dashpot 11' is also located within the cavity in the blade body 1', but on the opposite side of the cavity from the spring 9'. The dashpot 11' is operatively connected between the blade body 1' and the control surface 2' by a bracket 12' connected to one end of the dashpot 11' to the top surface of the cavity within the blade body 1'. A link 20 is connected to the other end of the dashpot 11'. This link 20 extends through the upper wall of the blade body 1' through a suitable aperture 21 and is pivotally connected to an arm 22 fixed to and projecting from the upper surface of the airfoil control surface 2'.

The recited connection operatively connects a pendulously suspended mass 6' to an airfoil control surface 2' and constitutes an aerodynamic vibration damper which is substantially similar in operation to the system disclosed in the first embodiment of the invention, previously described.

Of course, the dashpot 11' and spring 9' could be operatively positioned on the outside of the blade body 1' if it is found advantageous to do so.

The foregoing description and illustration in the accompanying drawings should be taken in an illustrative rather than in a limiting sense, therefore, obvious changes and modifications may be made in the construction as illustrated and described herein without departing from the spirit and scope of the invention as defined in the accompanying claims.

I claim:

1. A helicopter blade vibration damping assembly comprising a rotor blade subject to vertical forced vibrations of predetermined frequencies and having a trailing edge, an airfoil control surface having a leading edge hinged to the trailing edge of said blade and extending spanwise of the blade sufficient to aerodynamically damp the forced vibrations of the blade at resonance when actuated to lead the vibration of said blade at a 90° phase angle, a predetermined weight rigidly attached to the end of a lever arm, the other end of said arm rigidly attached in outstanding fashion to the leading edge of the airfoil control surface, whereby the hinge connection of the airfoil control surface provides a common pivot for both said weight and said airfoil control surface, and said weight is free to oscillate in the plane of the forced vibrations, tuned tension spring means operatively connected between the airfoil control surface and said blade to yieldably oppose pivotal movement of said weight and said control surface from a neutral position, whereby the pivotally mounted weight and spring means constitute a tuned pendulum having a predetermined natural frequency of oscillation equal to the natural frequency of the blade assembly, or some harmonic thereof to actuate the airfoil control surface at resonance to lead said forced vibrations at a 90° phase angle, whereby to dampen said blade oscillatory vibrations aerodynamically by said control surface when the forced vibrations approach the critical frequency of the blade assembly.

2. In a helicopter blade adapted to vibrate at a predetermined natural frequency in a substantially vertical direction, said blade having lead and trailing edges, an airfoil vibration control surface hinged to the blade spanwise thereof at its trailing edge for vertical tilting movements to aerodynamically control the vertical oscillations of said blade, said blade having a cavity therein intermediate its leading and trailing edges and its upper and lower surfaces, a pendulum arm rigidly connected to the air foil control surface and extending into said cavity in a direction substantially perpendicular to the direction of the blade oscillations, means connecting said pendulum arm to said airfoil control surface at one side of its pivotal connection for movement about said pivot in a direction opposite to the movement of said arm, a predetermined weight fixed to the outer end of said arm, spring means within said cavity connected between said airfoil control surface and said blade tuned in combination with said weight to oscillate at the normal vibration frequency of said blade, and a dash pot within said cavity connected between said control surface and said blade for damping the oscillations of said airfoil control surface.

References Cited in the file of this patent

UNITED STATES PATENTS

| | | |
|---|---|---|
| 989,958 | Frahm | Apr. 18, 1911 |
| 1,783,348 | Taylor | Dec. 2, 1930 |
| 1,836,406 | Smith | Dec. 15, 1931 |
| 1,885,578 | Boykow | Nov. 1, 1932 |
| 2,038,603 | Roche | Apr. 28, 1936 |
| 2,232,289 | Upson | Feb. 18, 1941 |
| 2,332,516 | Kemmer | Oct. 26, 1943 |
| 2,625,997 | Doak | Jan. 20, 1953 |
| 2,655,326 | Weick | Oct. 13, 1953 |

FOREIGN PATENTS

| | | |
|---|---|---|
| 691,395 | Germany | May 25, 1940 |